United States Patent Office 3,842,155
Patented Oct. 15, 1974

---

3,842,155
TREATMENT OF WASTE MATERIALS GENERATED IN THE CONVERSION OF UF$_6$ TO UO$_2$ BY THE AUC ROUTE
Henricus Muller, Hanau (Main), Hans Pirk, Dornigheim, and Karl Hackstein, Hanau (Main), Germany, assignors to Nukem, GmbH, Hanau (Main), Germany
Continuation-in-part of application Ser. No. 835,509, June 23, 1969, now Patent No. 3,758,280. This application Nov. 22, 1971, Ser. No. 200,857
Claims priority, application Germany, Apr. 23, 1969, P 19 20 479.6; Nov. 25, 1970, P 20 57 966.2
The portion of the term of the patent subsequent to Sept. 10, 1990, has been disclaimed
Int. Cl. C01f *15/00*; C01g *43/00*
U.S. Cl. 423—15                                        12 Claims

ABSTRACT OF THE DISCLOSURE

As shown in the drawings FIG. 1 and FIG. 2, NH$_3$, CO$_2$, uranium, and fluorine, the latter either in the form of ammonium hydrogen fluoride or in the form of calcium fluoride, are recovered from NH$_4^+$, carbonate, uranium and fluoride containing waste water from the precipitation of uranium from UF$_6$ in aqueous solution as tetraammonium uranyl tricarbonate and condensed, NH$_3$ and CO$_2$ containing waste gases from the decomposition of tetraammonium uranyl tricarbonate by employing a circulatory process having a first phase in which the two waste solutions are reacted with a strongly acid solution of ammonium fluoride and ammonium hydrogen fluoride to liberate carbon dioxide and bind ammonia and a second phase wherein the resulting weakly acid carbonate free solution is partly evaporated to set free ammonia and regenerate the strongly acid solution and a part stream of the acid solution is withdrawn from the CO$_2$-liberating circuit to maintain the fluorine content of the circuit constant and the uranium is recovered by precipitating it from the said part stream with ammonia and hydrogen peroxide, whereafter the remaining solution is freed of fluorine by precipitating the latter as an insoluble fluoride.

---

Figure 1:
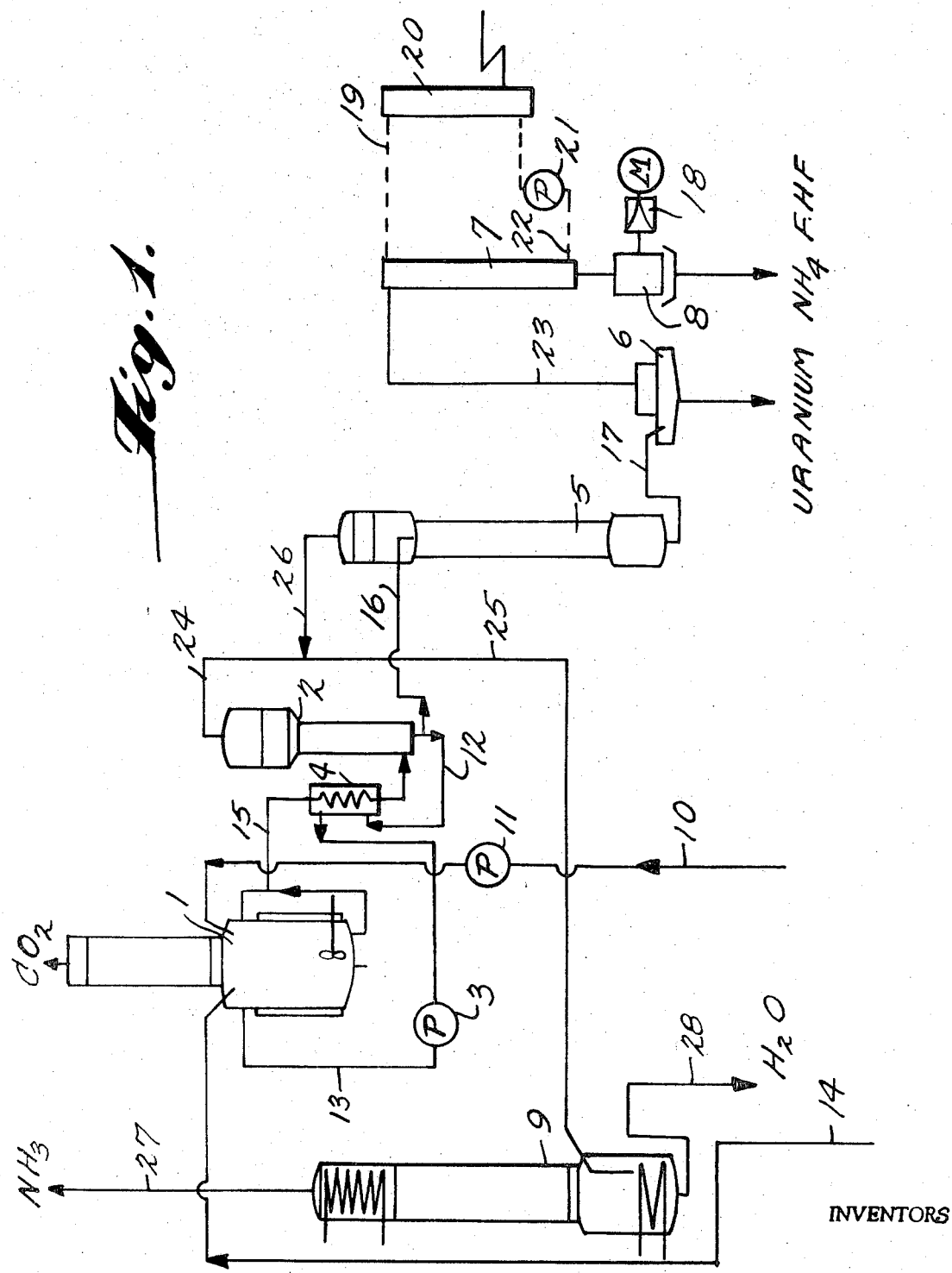

This application is a continuation-in-part of application 835,509, filed June 23, 1969 corresponding to German application P 19 20 479.6, now Pat. No. 3,758,280.

The present invention is directed to a process for the recovery of uranium, ammonium hydrogen fluoride, ammonia, carbon dioxide and water from the filtrates and waste gases which arise in the conversion of mono-uranium hexafluoride to uranium dioxide by the precipitation of the uranium as tetrammonium uranyl tricarbonate, the so-called AUC, and the associated reductive pyrohydrolysis of this salt.

At a large plant for the production of uranium dioxide the filtrate constitutes the major part of the liquid waste, which results in a considerable salt load in the environment of the discharge of water when the fact is considered that the production of 1000 kg. UO$_2$ necessarily results in over 800 kg. of ammonium fluoride.

In the same manner, the blowing away of the waste gases leads to an objectionable pollution of the air in the nearest surroundings. Thus, in the production of 1000 kg. of UO$_2$ more than 300 Nm.$^3$ of ammonia escapes. Besides, it is not always possible without a very expensive filter system to avoid the loss of economically not to be overlooked amounts of uranium to the atmosphere.

The change of UF$_6$ to UO$_2$ according to the method indicated in the first paragraph, which in the following description will be designated as "AUC-conversion" goes according to the following reaction equations.

$$UF_6 + 5H_2O + 10NH_3 + 3CO_2 \rightarrow (NH_4)_4UO_2(CO_3)_3 + 6NH_4F \quad (I)$$

$$(NH_4)_4UO_2(CO_3)_3 \rightarrow UO_3 + 4NH_3 + 3CO_2 + 2H_2O \quad (IIa)$$

$$UO_3 + H_2 \rightarrow UO_2 + H_2O \quad (IIb)$$

From these equations, it is evident that in the overall reaction the CO$_2$ is not consumed and only that portion of the NH$_3$ is consumed which is used to bind the fluorine set free from the UF$_6$. It is obviously desirable, therefore, to recover both of these products and to return them again to the process. This is especially so since in the precipitation I naturally an excess of NH$_3$ and CO$_2$ is used rather than the addition of only stoichiometric amounts.

The ammonium fluoride which arises according to equation I and exists in the dissolved form in the filtrate from the precipitation is a by-product and after isolation and eventual change to ammonium hydrogen fluoride finds further use.

Furthermore, there are found in the filtrate residues of uranium corresponding to the solubility of the precipitated uranyl salt under the given conditions.

Finally, the water being a valuable material, since the process is carried out under nuclear-pure conditions, also should be reconditioned and recycled. This is so not only for the filtrate water but also for the water that leaves the pyrohydrolysis in the steam state, especially if these steps (IIa and IIb) are carried out as a fluidized bed where steam is used as the fluidizing gas.

With the process of the invention, it is now possible to recover completely, quantitatively and in an economical manner, all of the compounds contained in the filtrate and the waste gas, either in their original or otherwise usable form.

One can without difficulty devise a number of methods to isolate one or another component of the waste gases or waste water, be it for reutilization or for detoxication.

Thus, there are known processes for the separation of ammonia and carbon dioxide which use aqueous solutions of ammonium nitrate or ethanolamine.

The ammonia can be set free from the filtrate by admixing with soda lye. The fluorine can be deposited and separated as slightly soluble calcium fluoride.

These and similar processes however, besides other disadvantages, have in common that they are either excessively expensive apparatus-wise, as for example the mentioned gas separation, or require the use of enormous quantities of rather expensive adjuvants which are irrecoverably lost. The salt concentration in the waste water increases rather than decreases through treatment of the filtrate with soda lye for the purpose of ammonia recovery, or the use of hydrochloric acid or sulfuric acid for recovery of carbon dioxide.

Summarizing, it can be said that such processes in the cases at hand for these reasons, and not least because of the relatively small throughput in the UO$_2$ production, do not bear an exact economical calculation.

The process according to the invention requires no adjuvants. There is relatively little expenditure for apparatus and no waste material is produced. To describe the process it is advantageous to sketch briefly the behavior of the filtrate in thermal decomposition.

With warming of the filtrate, there occurs at about 60° C. gas development. Between 60° C. and 100° C. there escapes a mixture of ammonia, carbon dioxide and steam, which can be condensed by suitable management to dry ammonium carbonate salt.

From 100° C. on the gas phase over the now carbonate free solution consists of ammonia and steam whereby the ratio of ammonia to H$_2$O in the gas strongly increases with increase in the salt concentration in the solution. It is of fundamental significance for the new process that in this stage of the evaporation a clear, reproducible relation exists between the boiling point and the acidity of the solution. While the fresh filtrate contains 1 to 2.5 N titratable base or free ammonia, the residual solution on reaching a boiling point of 118° C. shows about 3 N free acid.

At about 125° C. an almost water free melt of ammonium fluoride and ammonium hydrogen fluoride exists which by continuing of the heating gives up more ammonia, until finally, at the latest at 240° C., the boiling point of $NH_4FHF$, the latter salt can be distilled in pure form, whereby the uranium originally in the filtrate remains behind as non-volatile $UF_4$ and $UO_2F_2$.

Since the ammonium carbonate obtained by direct distillation from the filtrate is little suited for further use in the conversion, the invention provides for the recovery of ammonia and carbon dioxide as pure gases.

For that purpose, the filtrate is evaporated until a 3 N acid solution arises. Fresh filtrate and waste gas from the pyrohydrolysis of the ammonium uranyl carbonate is led into this solution in such amount that the pH of the mixture becomes no higher than 6.5. Thereby, the $CO_2$ contained in the filtrate and waste gas is set free quantitatively.

The so obtained weakly acid, carbonate free solution is again partly evaporated, whereby ammonia and steam escape. For the purpose of recovering pure ammonia these are separated by rectification. When the solution again reaches an acidity of 3 N a part is used to free the next charge of filtrate and waste gas from carbonate.

The remaining part is further evaporated until in the manner described a $NH_4FHF$ melt in obtained which is distilled to separate it from uranium.

In this manner continuously a part of the strongly acid solution is returned for $CO_2$ recovery, while from the other part $NH_4FHF$, uranium fluoride as well as more ammonia and water are obtained.

Figure 2:
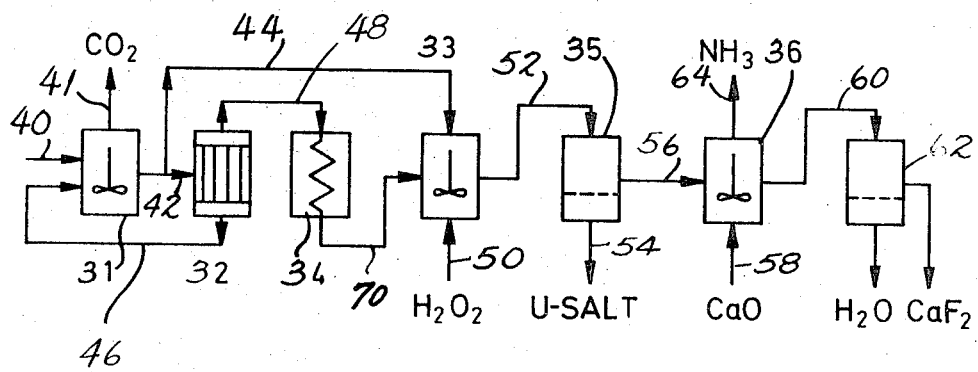

FIG. 1 of the drawings is a flow diagram for carrying out the process of the invention in the parent case and FIG. 2 is a flow diagram for carrying out the invention in the present case.

The procedure of the invention in the parent case is illustrated in following Examples 1–3.

In the drawings like numerals indicate like parts.

Example 1

From the filtrate from the AUC-conversion that contains, for example, 120 grams per liter fluorine, 140 grams per liter $NH_4+$ and 40 grams per liter $CO_3=$ as well as 150 mg. per liter of uranium and shows a free base content of 2 N there were evaporated 132 liters. As a result $CO_2$, $NH_3$ and steam escaped. After 35–40 liters had volatilized, the pH value changed into the acid range and by further volatilization sank progressively. When the volume was concentrated to 36 liters, the solution contained 440 grams per liter fluorine and 280 grams per liter $NH_4+$ at a free acid content of 3 N and a boiling point of 115–118° C. The solution was allowed to cool to about 80° C. and 12 liters of fresh filtrate introduced as well as 5.9 Nm.³ of waste gas from the pyrohydrolysis, namely the amount of waste gas which is given off parallel to 12 liters of filtrate. This 5.9 Nm.³ contains 39.08 mol of $NH_3$, 29.31 mol of $CO_2$ and 195.61 mol of water.

Through this acidification of the basic filtrate as well as through the absorption of $NH_3$ and $H_2O$ from the gas mixture there was set free in all 37.49 mol of $CO_2$.

There remained behind 50.5 liters of solution containing 342.3 grams of fluorine and 248.7 grams per liter of $NH_4 +$ at an acidity of 0.9 N.

This 50.5 liters of carbonate free solution was again evaporated until the residue had an acidity of 3 N. For this purpose, the volume must be concentrated to 39.27 liters whereby 86.87 mol of ammonia and 627.7 mol of steam were separated by rectification. From the remaining 39.27 l. of 3 N solution which again contained about 440 grams of fluorine per liter, 36 liters were used for reaction with following filtrate and gas charges whereupon the described result was repeated.

The remaining 3.37 liters were employed for the $NH_4FHF$ production. This amount was further evaporated to 2160 grams of $NH_4FHF$, corresponding to the amount of fluorine contained in 12 liters of filtrate. Thereby a further 10.87 mols of $NH_3$ and 82.5 mols of steam were liberated which were fed to the rectifier. The $NH_4FHF$ was distilled for decontamination or recovery of uranium whereby, for example 2.4 grams of $UF_4$ were obtained.

The continuous carrying out of this process is illustrated in Example 2 in connection with FIG. 1 of the drawing.

Example 2

The filtrate from the precipitation of AUC that, for example, contains 120 grams per liter of fluorine, 140 grams per liter of $NH_4+$, 40 grams per liter of $CO_3=$, as well as 100–200 mg. per liter of uranium was pumped at the rate of 120 liters per hour into a container 1 having a stirrer and with a useful volume of 250 liters through conduit 10 with the aid of pump 11. The filtrate was mixed in container 1 with such an amount of strongly acid solution coming from the evaporator 2 via conduit 12, heat exchanger 4, rotary pump 3 and conduit 13 that the pH value in the stirred container remained 6.5. If the waste gases from the apparatus (not shown) for pyrohydrolysis of AUC are also treated by introduction through conduit 14, the 59 Nm.³ per hour of such gases supply 6.6 kg. per hour of $NH_3$, 12.9 kg. per hour of $CO_2$ and 35.2 kg. per hour of steam it is necessary to add to the container 1 an additional 360 liters per hour of the acid solution. In this case it is appropate to form the upper part of the stirred container 1 as a contact tower which is sprayed from above with acid solution. There escapes from the stirred container 48–50 kg. per hour of moist $CO_2$ which is otherwise pure and which is stored after drying.

The slightly acid, now carbonate free, solution from container 1 is lead by syphon tube 15 to circulatory evaporator 2 where it is continuously regenerated to a strongly acid solution with a boiling point of 118–120° C. In addition to ammonia about 86 liters per hour of water are evaporated for this purpose. The equation for the reaction in evaportor 2 is $2NH_4F \rightarrow NH_4HF_2+NH_3$.

From the thus obtained 3 N acid solution as said 360 liters per hour are pumped back into container 1. There is set up a circuit in which an acid solution with the aid of the pump, on the one hand, takes up ammonia, fluorine, and supplementary water, but on account of its acid content takes up no $CO_2$ and on the other hand, is then freed of the $NH_3$, $H_2O$ and fluorine taken up.

In the heat exchanger 4, the temperature equilibrium is reached between the weakly acid and strongly acid solutions. Accordingly, a temperature of 70–80° C. prevails in container 1. Radiation loss in container 1 is equalized by the heat of neutralization released.

While the solution flowing from container 1, which exhibits an acidity of 0.5-1N is freed by boiling in evaporator 2 from $NH_2$ and $H_3O$ which has been taken up, the fluorine, normally 14.4 kg. per hour, which is brought into the circuit with the filtrate is drawn off, or the fluorine content of the circuit is held constant while a corresponding part of the solution, normally 35 liters per hour goes via conduit 16 to column 5 where through a rectification process the water and the overstoichiometric ammonia based on $NH_4FHF$ are evaporated. This column can be laid out as a packed column or as a tube bundle column or according to any other trickle film principle. In the sump of this column, which is separately heated, the last residue of the overstoichiometric $NH_3$ is driven off at 230–240° C. so that per hour 21.6 kg. of an $NH_4FHF$ melt, which now is contaminated only with uranium runs over a syphon tube 17 into the shallow evaporator 6 where the fluoride is vaporized for purpose of purification and goes to conduit 23. The uranium remains behind as fluoride and can be sucked out in the form of a loose powder in regular time intervals. The vaporized $NH_4FHF$ is condensed slightly above its melting point (126° C.) in condenser 7 which is thermostatically controlled with a heat transfer oil and can be carried off by flaking roll 8 driven by motor 18. The heat transfer oil circuit comprises conduit 19, cooler 20, pump 21 and conduit 22.

The vapors from evaporator 2 were conducted via conduits 24 and 25 and the vapors from evaporator 5 were conducted via conduits 26 and 25 to rectifying column 9 where the $NH_3$ was separated from the water, the ammonia going off at the top through conduit 27 and the water coming off at the bottom through conduit 28. The water obtained showed a very little ammonia, and can be applied again to the precipitation without further purification.

Preferred operating conditions are as follows:
1. Liberation of $CO_2$ 50–80° C.
2. pH of liquid leaving vessel 1 is 5.5 to 6.5
3. Temperature in evaporator 2 100–125° C.
4. Acidity developed in evaporator 2 is 2.5–3.5 N.
5. Fluorine content of solution in evaporator 2 is 300 to 400 grams per liter.

Example 3

A gas mixture consisting of $NH_3$ ond $CO_2$ in a ratio of 1:0.752 by volume is introduced into a stirring container 1 through conduit 14 at a rate of 7.22 $Nm.^3/h$. This container forms part of a circuit containing 1000 l. of an acid, aqueous solution of $NH_4F$ and $NH_4HF_2$ with a concentration of 400 g./l. fluorine and 284 g./l. $NH^+_4$.

This solution being acid, containing in fact 3 N of titratable acid when entering the container 1, the ammonia from the gas is readily dissolved, whereas the $CO_2$ escapes quantitatively from the container and is stired after drying.

The absorption of $NH_3$ lowers the acidity of the solution to 0.7 N. This slightly acid solution is lead by syphon tube 15 at a rate of 1000 l./h. to circulatory evaporator 62, where it is continuously regenerated to a 3 N acid solution with a boiling point of 118–120° C. by evaporation of 1.85 kmol/h. of $NH_3$ and ca. 10.55 kmol/h. of $H_2O$. The equation for the reaction in evaporator 2 is again

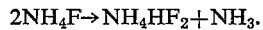
$$2NH_4F \rightarrow NH_4HF_2 + NH_3.$$

The remaining 3 N acid solution, about 810 l./h., is continuously pumped back into container 1 by way of conduit 12, heat exchanger 4, rotary pump 3, and conduit 13.

In the heat exchanger 4, temperature equilibrium is reached between the slightly acid and strongly acid solutions. Since, however, the loss of heat by radiation from container 1 is exceeded by the heat of neutralization released by the reaction between $NH_3$ and the acid solution, container 1 has to be cooled in addition so as to keep the temperature under 80° C., above which point the $CO_2$ is likely to be contaminated with $NH_3$.

The mixture of $NH_3$ and steam, 27.8 $Nm.^3/h.$, from evaporator 2 flows via conduits 24 and 25 to rectifying column 9, where the $NH_3$ is separated from the water, the ammonia going off at the top through conduit 27 to be dried and stored, the water leaving the still through conduit 28.

In the process just described the part of the stream withdrawn over syphon tube 17 goes to shallow evaporator 6 and the uranium is recovered by the distillation of the ammonium hydrogen fluoride, the uranium remaining behind as the fluoride.

It has been found that an improvement in the above-described process can be obtained if on the one hand the branching of the part of the stream does not take place from the concentrated product but from the nonconcentrated solution which flows into the evaporator and on the other hand the recovery of the uranium does not take place through distillation of the ammonium hydrogen fluoride but instead is accomplished by continuous precipitation with hydrogen peroxide from the non-concentrated, branched solution after this is made alkaline with ammonia, e.g. to a pH of 8 to 9.

The advantage of this process is that on the one hand the energy requirements of the evaporator are substantially reduced since only a portion of the solution becomes concentrated, and that on the other hand the uranium is obtained in a form which is suitable for direct further processing without additional purification.

Example 4 illustrates the improved process of the invention.

EXAMPLE 4

Referring to FIG. 2 of the drawing the process is carried out by treating a filtrate from the precipitation of AUC and/or condensed waste gases from the pyrohydrolysis of AUC. (Either the waste water or waste gases or both can be treated.) Thus there was treated a mixture of 48.55 grams per liter of fluorine, 85.63 grams per liter of $NH_3$, 81.88 grams per liter of $CO_2$ ($CO_3^=$) and 125 milligrams per liter of uranium (in soluble form) which was pumped via conduit 40 at the rate of 1000 liters per hour into a container 31 having a useful volume of 300 liters and equipped with a stirrer. In this container the feed solution was mixed with such an amount of strongly acid solution coming from evaporator 32 via conduit 46 that the concentration of titratable acid in the stirring container remained at about 1.5 N. There were removed overhead via conduit 41 as a gas 81.88 kilograms per hour of moist $CO_2$, which was otherwise pure and could be stored after drying.

Of the slightly acid, now carbonate free, solution leaving container 31 at a rate of 2990 liters per hour which solution contained 242.75 grams per liter of fluorine and 191.60 grams per liter of $NH_3$, 2790 liters per hour were passed via conduit 42 into the thermosiphon evaporator 32 and the balance, 200 liters per hour was diverted and fed via conduit 44 directly to the precipitator 33. The solution fed to evaporator 32 was continuously regenerated therein to a 3.5 N acid solution with a boiling point of 118 to 120° C. by boiling 47.31 kilograms per hour of $NH_3$ and 772.8 kilograms per hour of water. These vapors were fed via conduit 48 to condenser 34 where they were condensed to 800 liters per hour of ammonia solution. This condensate was led via conduit 70 to precipitator 33.

The 3.5 N acid solution produced in the evaporator 32, amounting to 1990 liters per hour was siphoned back into container 31 via conduit 46 to be mixed with the incoming waste solution from conduit 40.

It can be seen that the amount of solution withdrawn from container 31 into precipitator 33 is so chosen, that the total amount of fluorine in the loop constituted by container 31 and evaporator 32 is kept constant.

To the mixture in precipitator 33 there were metered 745 grams per hour of hydrogen peroxide in the form of a 45% aqueous solution (the $H_2O_2$ content can vary for example, if desired, from 30 to 60%) through conduit 50. Thereby about 200 grams per hour of an insoluble uranium compound were precipitated. The useful volume of the precipitator was such that a mean residence time of two hours was available for the precipitation reaction. The suspension from precipitator 33 was pumped via conduit 52 to filter 35 (alternatively a centrifuge can be employed) at a rate of 1000 liters per hour. The insoluble uranium compound was removed via conduit 54, and collected for the recovery of the uranium. The filtrate, now containing less than 10 milligrams per liter of uranium was continuously pumped via conduit 56 to precipitator 36 at a rate of 1000 liters per hour.

85.86 kilograms per hour of solid calcium oxide were continuously fed via conduit 58 to precipitator 36 while the reaction mixture was held at a temperature of 100° C. The fluorine was quantitatively converted into insoluble calcium fluoride. The pH of the mixture was about 12.5 because of the 20% excess of CaO relative to fluorine, as a result of which about 85 kilograms per hour of gaseous ammonia was liberated and removed via conduit 64. This ammonia can be reused.

Calcium oxide is the preferred calcium compound to add since in contrast to calcium hydroxide it permits the production of an easily filterable, crystalline calcium fluoride.

From the precipitator 36 which was designed for a mean residence time of 2 hours, the $CaF_2$ slurry was continuously pumped via conduit 60 to filter 62 where the solid $CaF_2$ was separated from the filtrate. The moist filter cake discharged per hour contained 99.66 kilograms of $CaF_2$, 18.91 kilograms of $Ca(OH)_2$ and about 47 kilograms of water.

Alternatively the slurry of $CaF_2$ can be neutralized with $CO_2$ before filtration, whereby the $Ca(OH)_2$ is converted into the much less soluble $CaCO_3$ and a neutral filtrate obtained.

In either case the filtrate contains at most 10 milligrams per liter of fluorine and 200 milligrams per liter of ammonia. Both the filtrate and the solid contain only insignificant traces of uranium.

While as stated calcium oxide is the preferred source of calcium, there can be employed to precipitate calcium fluoride the compound calcium hydroxide.

While the calcium compound can be added in a stoichiometric amount to form calcium flouride, preferably it is added in excess, e.g. 120% of the stoichiometric amount.

The recovery of ammonia can be made to be almost quantitative by carrying out the precipitation of calcium fluoride at elevated temperatures, preferably between 80 and 100° C.

What is claimed is:

1. In a process for the simultaneous recovery of $NH_3$, $CO_2$ and fluoride from $NH_4^+$, $CO_3^=$ and fluoride containing filtrate from the precipitation of tetraamonium uranyl tri carbonate the improvement comprising in a first phase of a circulatory process reacting said filtrate with a strongly acid aqueous solution of ammonium fluoride and ammonium hydrogen fluoride, liberating carbon dioxide and binding ammonia and reducing the acidity by such reaction, removing the liberated carbon dioxide from the filtrate, in a second phase of the circulatory process continuously evaporating the weakly acid and carbonate free solution so formed and thereby setting free ammonia, removing the ammonia set free and thereby regenerating the strongly acid solution, maintaining the fluoride content of the circuit constant by withdrawing from the circuit sufficient of the stream of strongly acid solution to prevent increase in fluoride, precipitating uranium from the said withdrawn stream by adding ammonia and hydrogen peroxide and removing fluoride ions from the remaining withdrawn stream by precipitating the fluoride as insoluble calcium fluoride by adding a calcium compound which is calcium oxide or calcium hydroxide.

2. A process according to claim 1 comprising mixing a further charge of filtrate with the regenerated carbonate free, strongly acid solution.

3. A process according to claim 1 wherein ammonia is recovered quantitatively as aqueous ammonia from the liquid from which the fluoride is precipitated as calcium fluoride and simultaneously with the calcium fluoride formation by carrying out the calcium fluoride precipitation at a temperature between 80 and 100° C.

4. A process according to claim 1 wherein the liberation of $CO_2$ and the binding of ammonia is carried out at a temperature of 50–80° C. and a pH of 5.5 to 6.5.

5. A process according to claim 1 wherein the weakly acid solution is heated to a temperature of 100 to 125° C. to form a solution containing $NH_4FHF$ and $NH_4F$ and having an acidity of 3 to 3.5 N and containing 300–400 grams per liter of fluorine.

6. A process according to claim 1 wherein solid calcium oxide is added to the filtrate from the hydrogen peroxide precipitation to precipitate calcium fluoride.

7. A process according to claim 1 wherein there is added to the filtrate from the hydrogen peroxide precipitation calcium oxide to precipitate the fluorine as calcium fluoride.

8. A process according to claim 7 wherein the amount of calcium oxide is 120% of the stoichiometric amount relative to the fluorine content of the solution.

9. A process according to claim 1 wherein the uranium is recovered by the additional steps of further concentrating the withdrawn stream, separating the ammonium hydrogen fluoride from the uranium containing material by volatilizing the ammonium hydrogen fluoride.

10. A process according to claim 1 including the additional steps wherein the uranium containing $NH_4FHF$ solution from which the ammonia and carbon dioxide have been removed is purified in a single step distillation of the $NH_4FHF$ and the uranium is recovered in the residue as the fluoride.

11. In a process for the simultaneous recovery of $NH_3$, $CO_2$ and fluoride from $NH_4^+$, $CO_3^=$ and fluoride containing waste water, from the precipitation of tetraammonium uranyl tricarbonate the improvement comprising in a first phase of a circulatory process reacting said waste water with a strongly acid aqueous solution of ammonium fluoride and ammonium hydrogen fluoride, liberating carbon dioxide and binding ammonia and reducing the acidity by such reaction, removing the liberated carbon dioxide from the filtrate, in a second phase of the circulatory process continuously evaporating the now weakly acid and carbonate free solution so formed to boil off ammonia and water and thereby regenerating the strongly acid solution, separating the ammonia and water by rectification, and maintaining the volume of the circulating solution constant by feeding back aqueous condensate from ammonia rectification step.

12. A process according to claim 1, wherein the calcium compound is calcium hydroxide.

References Cited

UNITED STATES PATENTS

| | | | |
|---|---|---|---|
| 2,770,521 | 11/1956 | Spiegler | 423—16 |
| 2,551,543 | 5/1951 | Mohr | 423—16 |
| 2,982,602 | 5/1961 | Sherk et al. | 423—11 |
| 3,029,131 | 4/1962 | Ruhoff et al. | 423—15 |
| 3,100,682 | 8/1963 | Kelmers | 423—11 |
| 3,174,821 | 3/1965 | Opratko et al. | 423—15 |
| 3,265,471 | 8/1966 | Pottier | 423—253 |
| 3,288,569 | 11/1966 | Henrickson et al. | 423—20 |
| 3,394,997 | 7/1968 | Hollander | 423—15 |
| 3,519,403 | 7/1970 | Vietke et al. | 423—261 |

BENJAMIN R. PADGETT, Primary Examiner

R. L. TATE, Assistant Examiner

U.S. Cl. X.R.

423—11, 16, 18, 19, 20, 253, 261; 252—301.1 R